May 21, 1940.　　V. S. MAKAROFF ET AL　　2,201,189
PNEUMATIC AUTOMOBILE LIFT
Original Filed Dec. 1, 1937

VADIM S. MAKAROFF
ALEXIS JACKSON
INVENTORS

BY John P. Nironov
ATTORNEY

Patented May 21, 1940

2,201,189

UNITED STATES PATENT OFFICE 2,201,189

PNEUMATIC AUTOMOBILE LIFT

Vadim S. Makaroff, New York, and Alexis Jackson, Niagara Falls, N. Y.; said Jackson assignor to said Makaroff Application December 1, 1937, Serial No. 177,480
Renewed September 20, 1939

5 Claims. (Cl. 254—91)

Our invention relates to auto lifts and has particular reference to lifts or lifting devices for automobiles and similar vehicles.

An important object of our invention is to provide a lift with parallel beams or rails adapted to support an automobile, a mechanism being provided for raising the beam in a substantially horizontal position. For this purpose we provide a longitudinally extending base and connect it at the ends with the beams by two sets of arms, the ends of the arms being respectively connected by pivots with the base and the beam so as to form two parallelograms. We also provide a motor for turning one set of the arms on their pivots for raising them with the beams.

Another object of our invention is to provide a lift having its mechanism mounted below the level of the floor in a garage or repair shop, the lifting beams or rails only being exposed, thereby eliminating all the possible obstructions for work around the automobile supported on the beams. For this purpose we provide a motor in the form of a cylinder mounted on a base supported below the floor level, the cylinder having a piston connected with one set of arms. We also provide a ratchet bar pivotally connected with the cylinder and engaging the piston in such manner that the ratchet bar supports the piston and the arms in a raised position. We also provide a manually operable valve for controlling the admission of a compressed fluid into the cylinder. For releasing the ratchet bar we provide a smaller air cylinder with a piston which moves the bar away from the arms when the cylinder is under pressure thereby releasing the piston so that the latter can move back into the cylinder under pressure from the rails and the automobile.

Another object of our invention is to provide a device especially suitable for lifting automobiles or similar vehicles by their front and rear axles which are located at different elevations above the floor. For this purpose we provide certain small clearances in the pivoted connections between the arms and the beams so as to enable the beams or rails to deviate from the true horizontal position when they first come in contact with the axles. A small freedom of motion thereby obtained causes the lifting force to be distributed and equalized so that the rails come in contact with both axles before the axles begin to be raised. The best results are obtained when an automobile is placed with its front axle beyond the point on the rail where the end of one arm is pivoted. The rails then, upon striking the front axle, become fulcrumed on the latter and turn upward by their other ends until they also strike the rear axle. The force being thus equalized, the further movement of the arms results in the lifting of the whole automobile. This effect can be also obtained if there is but one lifting motor in which case the front axle of the automobile should be preferably placed over the motor.

We prefer to space the rails so that they can be used for supporting the axles between the wheels of an automobile, leaving the wheels free and accessible. In certain cases it is desired, however, to support the automobile by its wheels. For this purpose we provide an adapter in the form of a separate frame removably fitted over the beams and having flat beams or rails for supporting the wheels. The rails have flanges extending vertically so as to retain the wheels when they are lifted. The flat portions of the rails may be brought down to the level of the floor in order to facilitate placing the automobile thereon.

Our invention is more fully described in the accompanying specification and drawing in which—

Figure 1:
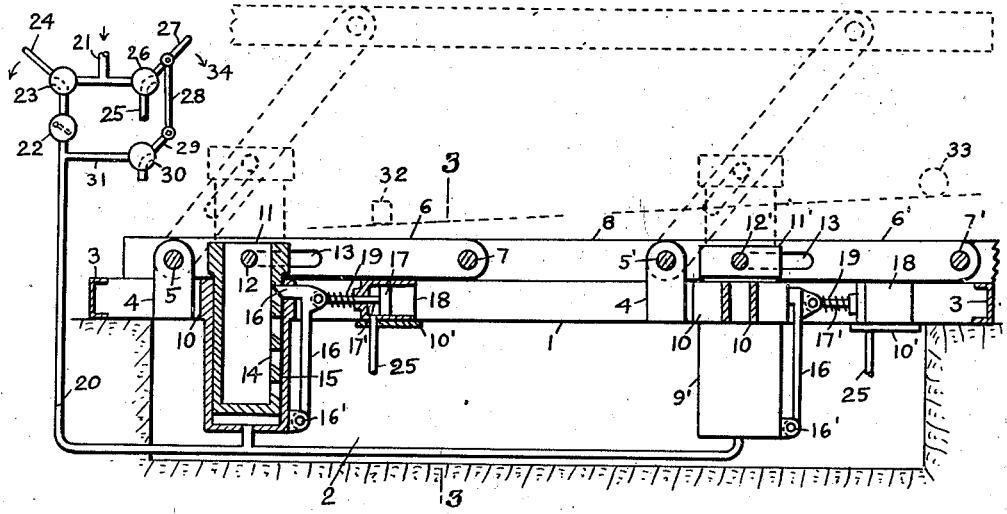
Fig. 1 is a sectional elevational view of our auto lift showing diagrammatically the arrangement of air valves.
Figure 2:
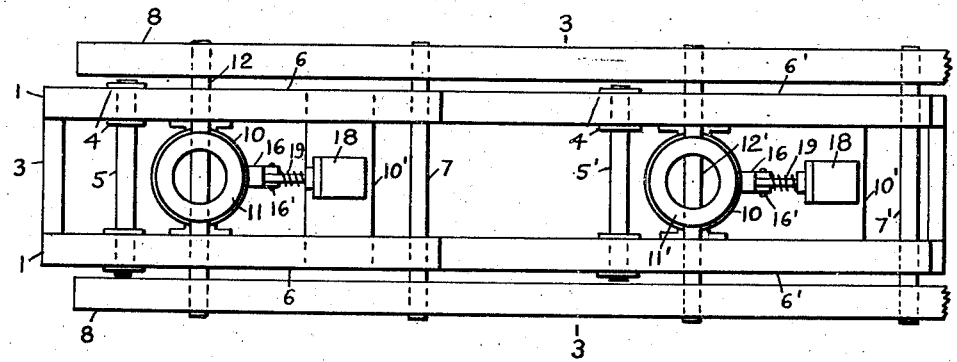
Fig. 2 is a top plan view of the same.
Figure 3:
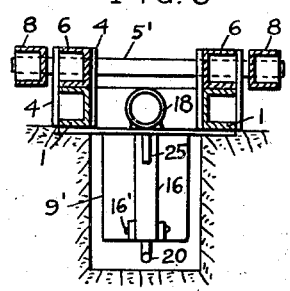
Fig. 3 is a sectional view taken on the line 3—3 of Fig. 1.

Our auto lift comprises a frame formed of two parallel beams 1 placed on shoulders in an excavation or pit 2. The beams are connected together at the ends by cross beams 3 and have bearing plates 4 with holes for shafts 5 and 5' supporting ends of arms 6 and 6' so that they lie horizontally on the beams. The other ends of the arms have holes for shafts 7 and 7' fitted by the ends in beams or rails 8. The latter are spaced apart so that they can support an automobile by its axles and are of sufficient length for lifting an automobile horizontally by both of its axles. Cylinders 9 and 9' have yokes 10 in the upper portions fastened by their flanges to the sides of the beams. Pistons 11 and 11' slide in the cylinders and have trunnions 12, 12' formed by shafts passing through the enlarged upper portions of the pistons. The trunnions pass through elongated slots 13 in the arms 6 and 6'. Notches 14 are provided in the sides of the pistons forming teeth 15 which are engaged by hooks on the ends of pawls 16. The other ends of the pawls are pivoted at 16' to the sides of the cylinders 9 and 9'. The pawls are pivotally connected with pistons 17 by links 17', the pistons sliding in cylinders 18 supported on yoke plates 10'. Springs 19 press the pawls against the pistons. The teeth 15 are tapered on the upper sides so that the pawl can slide over them when the pistons are raised but prevent the pistons from sliding down.

A pipe 20 extends from the cylinders 9 and 9' and is connected with a pipe 21 leading to a source of compressed air (not shown) or other suitable compressed fluid. A check valve 22 and a manually operable valve 23 with a handle 24 are placed in the pipe 21. The pipe 21 is also connected with a pipe 25 leading to the cylinders 18 and has a valve 26 with a handle 27. The latter is connected by a link 28 with a handle 29 of a valve 30 connected by a pipe 31 with the pipe 20.

The operation of our lift is as follows.

An automobile or similar vehicle is driven or moved over the lift so that its front axle 32 is placed beyond the shaft 7 as shown in dotted lines in Fig. 1, the rear axle 33 being also shown in dotted lines. The valve 23 is then opened admitting compressed air through the check valve 22 into the cylinders 9 and 9', causing the pistons 11 and 11' to move out of the cylinders. The trunnions or shafts 12 and 12' will lift the arms 6 and 6' thereby raising the beams 8. The latter will come at first in contact with the front axle 32 which is lower than the rear axle. Because of the increased resistance for the movement of the first piston, the beams 8 will rotate around the shafts 7 until their rear portions come in contact with the rear axle 33. This slight deviation from the true parallelogram is made possible by employing slight working clearances in the bearings for the shafts 5, 5', 7 and 7'. We have found that satisfactory results are obtained with clearances of about $\frac{1}{32}"$. After the load is thereby substantially equalized on both cylinders, the operation continues until the desired elevation is reached as shown in dotted lines in Fig. 1. The effect of small clearances in the bearings disappears at greater angles so that the beams 8 become again parallel to the base.

The pawls 16 slide over the teeth 15 and lock the pistons in the raised position by engaging the teeth even if the air should escape from the cylinders. For lowering the beams 8 the valve 23 is closed if it has not been closed before, and the valve 26 is opened by turning the handle 27 in direction of an arrow 34. Air is thereby admitted into the cylinder 18, forcing the pistons 17 into the cylinders against the tension of the springs 19 and withdrawing the pawls 16 from contact with the teeth 15. At the same time the valve 30 is opened by the link 28, releasing the air from the cylinders 9 and 9' so that the pistons can descend by gravity under the weight of an automobile on the rails 8.

Our lift can also operate satisfactorily if but a single cylinder 9 is used and if sufficient clearances are provided in the bearings as explained above so that the arm 6 can be raised ahead of the arm 6' thereby providing an angular pull on the latter arm. The initial lift is facilitated by the fact that there is no load on the arms until the beams touch the axles of the automobile and become tilted as explained above, equalizing the load on the arms before the automobile begins to be lifted.

Figure 4:
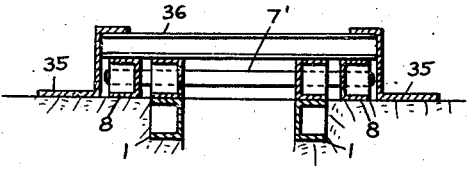
Fig. 4 is a sectional view of a lift with a removable frame for raising an automobile by its wheels.

A separate removable frame may be provided for lifting an automobile by its wheels as shown in Fig. 4. The frame consists of rails 35 connected together by braces 36 which can be placed on top of the beams 8. The rails 35 are made so that their horizontal portions can rest on the floor thereby making it possible to roll the automobile directly on the rails into the proper position for its lifting.

We claim as our invention:

1. An auto lift comprising a base having two parallel beams, two pairs of arms pivotally supported by their lower ends on the beams, rails pivotally supported on the upper ends of the arms, the arms and the rails forming two hinged parallelograms with the base, a cylinder mounted on the base by its upper end, a piston in the cylinder, a rod extending from the piston operatively connected with the middle portions of the arms, means to admit a fluid under pressure into the cylinder for raising the arms, means to lock the piston with the cylinder in the raised position, and a fluid operated means to release the locking means for lowering the arms.

2. An auto lift comprising a base having two parallel beams, two pairs of arms pivotally supported by their lower ends on the base, rails pivotally supported on the upper ends of the arms and adapted to support an automobile, the arms and the rails forming two parallelograms with the beams, a cylinder rigidly mounted on the beams, a piston in the cylinder, operative connections between the piston and one pair of arms, means to admit a fluid under pressure into the cylinder for raising the arms, teeth on the piston, a pawl on the cylinder adapted to engage the teeth for locking the piston in the raised position, and a fluid operated means to release the pawl for lowering the arms.

3. An auto lift comprising a base, arms pivotally supported on the base by their lower ends, rails pivotally supported on the upper ends of the arms and adapted to support an automobile, the arms and the rails forming parallelograms with the base, cylinders rigidly mounted on the base, pistons in the cylinders, operative connections between the pistons and the arms, pawls adapted to engage the pistons and to lock them in the raised position, air motors adapted to release the pawls from the pistons, a manually operable valve for admitting compressed air into the cylinders for raising the arms, a manually operable valve for admitting compressed air into the air motors for releasing the pawls from the pistons, and means to release the air from the cylinders by opening the air motor valve.

4. An auto lift comprising a base, arms pivotally supported on the base by their lower ends, rails pivotally supported on the upper ends of the arms and adapted to support an automobile, the arms and the rails forming parallelograms with the base, a fluid operated motor comprising a cylinder and a piston mounted on the base and operatively connected with one pair of the arms, means to lock the piston relatively to the cylinder in the raised position, a fluid operated motor for releasing the locking means, means to admit fluid into the lifting motor, means to release the fluid from the lifting motor, means to admit fluid into the releasing motor, and means to render the means for releasing fluid from the lifting motor operative by admitting fluid into the releasing motor.

5. An auto lift comprising a base, arms pivotally supported on the base by their lower ends, rails pivotally supported on the upper ends of the arms and adapted to support an automobile, the arms and the rails forming parallelograms with the base, cylinders rigidly mounted on the base, pistons in the cylinders, pivoted slidable connections between the pistons and the arms, means to lock the pistons relatively to the cylinders in the raised position, means to admit compressed fluid into the cylinders for raising the arms, means to release the fluid from the cylinders, means to release the pistons from the cylinders, and operative connections between the locking means releasing means and the means for releasing fluid from the cylinders for rendering the latter means operative when the pistons are released.

VADIM S. MAKAROFF.
ALEXIS JACKSON.